US005942261A

United States Patent [19]

Dreith

[11] Patent Number: 5,942,261

[45] Date of Patent: Aug. 24, 1999

[54] HANDHELD MODELING TOOL

[76] Inventor: Karen M. Dreith, 404 W. 8th St., Loveland, Colo. 80537

[21] Appl. No.: 08/946,896

[22] Filed: Oct. 8, 1997

Related U.S. Application Data

[63] Continuation of application No. 08/675,795, Jul. 5, 1996, abandoned.

[51] Int. Cl.[6] .................... B29C 59/02

[52] U.S. Cl. .................... 425/458; 15/145; 15/236.07; 81/489; 407/99; 425/268; 425/459

[58] Field of Search .................... 425/87, 265, 268, 425/458, 459; 264/138, 293; 30/329, 333, 334, 344; 407/64, 99, 106; 81/489, 491; 433/143, 147; 15/236.01, 236.03, 236.07, 143; 606/170

[56] References Cited

U.S. PATENT DOCUMENTS

| | | | |
|---|---|---|---|
| Re. 2,520 | 3/1867 | Merritt | 425/458 |
| D. 266,434 | 10/1982 | Kowalski | D8/98 |
| 430,186 | 6/1890 | Johnson | 425/458 |
| 751,848 | 2/1904 | Goldsmith | 30/344 |
| 852,159 | 4/1907 | Bode . | |
| 854,669 | 5/1907 | Reidy | 407/99 |
| 1,522,587 | 1/1925 | Hallstrom | 407/99 |
| 1,703,785 | 2/1929 | Shuttleworth | 425/458 |
| 2,545,521 | 3/1951 | Knapik . | |
| 2,670,647 | 3/1954 | Jones | 30/344 |
| 4,505,678 | 3/1985 | Andersson . | |
| 5,122,146 | 6/1992 | Chapman et al. . | |
| 5,174,028 | 12/1992 | Seltzer et al. | 30/329 |
| 5,743,737 | 4/1998 | Hawn et al. . | |

OTHER PUBLICATIONS

AP Parts Corporation Flyer, Toledo, Ohio, dated prior to 1950.

X–Acto Knives sales product information (1991) one sheet.

Peters Sculpture Supply Co. Catalog (1995) New York, pp. 1–3 and 28–31.

Dick Blick Art Materials Catalog (1995) Galesburg, Il p. 35.

Western Sculpting Supply Catalog (Denver).

Sculpture House Catalog (New Jersey Jan. 1996) pp. 8–10 and 13–15.

Johnson Atelier Catalogue #2 (1996) (Princeton Junction, NJ) pp. 9–10.

Loveland Academy of Fine Arts Supply Catalog. (Colorado).

*Primary Examiner*—Harold Pyon
*Assistant Examiner*—Joseph Leyson
*Attorney, Agent, or Firm*—Macheledt Bales & Johnson LLP

[57] ABSTRACT

A modeling tool for use with moldable materials having a handle with at least one end, a recess in the end for receiving an end-portion of a wire-end which is releasably secured to the handle. The wire-end may take on a variety of shapes, sizes, thicknesses, and cross-sectional shapes; and it can be made from a multitude of materials. The modeling tool has a threaded handle end for receiving a wire-end end-portion disposed within at least one groove of an at least partially threaded pin. The modeling tools could include a second end of the handle having a recess for receiving an end-portion of a second wire-end which can, also, be releasably secured to the handle.

6 Claims, 3 Drawing Sheets

HANDHELD MODELING TOOL

This application is a file wrapper continuing application of U.S. application Ser. No. 08/675,795 filed on July 5, 1996, now abandoned.

BACKGROUND OF THE INVENTION

In general, the present invention relates to modeling tools with wire-ends for cutting, carving/scraping, shaping/modeling, molding, and texturing a variety of soft materials (such as wax, soft clay, and plaster before they are hardened or fired into a final product such as sculptures, pottery, dishware, tiles, beads, walls, etc.). More particularly, this invention relates to a new modeling tool having a handle with at least one releasably secured sculpting end which can be replaced, without causing destruction of the tool, with a different sculpting end to achieve different modeling effects or if the sculpting end becomes worn, cracked, or broken.

The unitary wire-end sculpting tools currently used for shaping soft arts and craft materials into final products, are designed and built so that many different tools are required to achieve different modeling effects. Traditionally, one must have access to a different sculpting tool with a different wire-loop cross-section, shape, size, or stiffness to change the texture produced by scraping the wire-end over molding material, to change the size or depth of cut, or to change the wire edge sharpness to accommodate different material consistencies, etc. And in the event of breakage of a wire-end from one of these known sculpting tools, since the sculpting wires are permanently integrated with the handles, the whole tool must be thrown away and replaced with a new tool.

In its 1995 catalog, Peters Sculpture Supply (one known supplier of sculpting tools, equipment, and materials) displays a typical example of such known wire-end sculpting tools. In this catalog, each tool shown has at least one wire-end of a particular shape and size, permanently integrated with a handle. Wire-ends that have been shaped, and perhaps notched, are secured with ferrules that have been press-fit and permanently adhered to wooden handles. Smaller wire-end tools are displayed in the Peters Sculpture Supply catalog as "MINIATURE LOOPS"; they have smaller loop wire-ends that are likewise permanently integrated with pencil-shaped handles. It is no surprise that suppliers benefit from the sale of many of these known sculpting tools (which are inexpensive to mass produce, and yet often priced to reflect their high demand). However, for the artists working with soft, moldable materials to produce a variety of final arts and craft works, it becomes very costly to maintain a working full set of these known wire-end sculpting tools.

As the number of different available moldable arts and craft materials continues to grow, so does the number of different types of arts and craft end products; which in turn, creates a greater demand for sculpting tools that can produce a wider variety of modeling effects. Both hobby and professional artists, therefore, find themselves with a great need for many different sculpting tools having different cross-sections, shapes, sizes, and stiffness. To meet this increased demand without requiring artist-users to purchase many different whole modeling tools, and to reduce the waste associated with throwing away tools with broken, worn, or damaged sculpting wire-ends, the new modeling tool described herein was designed.

The particular design of the X-ACTO knife cutting tool is well known. A knife blade is sandwiched between the flat surfaces of two fingers, each having a half-round cross-section with its rounded outer surface threaded. A knurled collar, threaded along its inner surface so that it fits around the two half-round threaded fingers, is twisted to hold the X-ACTO knife blade in place between the two flat surfaces during use.

The particular design of a German PICKETT™ mechanical-compass (similar compasses are also supplied by Staedtler Mars and Koh-I-noor) is well known to those who create technical drawings by hand. Both the compass point and the writing implement (such as a piece of thick pencil lead) are sandwiched between two metal fingers spaced slightly apart, each having an inwardly and oppositely facing groove for receiving either the point or lead. A threaded screw with a large knob on one end and a nut on the other, extends through both metal fingers at a position along the fingers above the point or lead (to leave room for inserting the point or lead into the oppositely space-apart grooves). Twisting this large knob causes each metal finger to move together to grasp and hold either the point or lead in place during use.

Very distinctive from known tool designs is the new modeling tool described herein. It's simple and practical, by design. With its unique handle design and wire-end securing mechanism, this new modeling tool is capable of accepting and securing a wide variety of wire-ends with a variety of thicknesses, cross-sectional shapes, loop sizes and shapes, and stiffness, for cutting, carving/scraping, shaping/modeling, molding, or texturing a wide variety of soft, moldable materials into final products. The new handle and securing mechanism operate together to allow both hobby and professional artists to handily exchange one wire-end for another while their work is in-process. Additionally, with this new tool design, artists now have the flexibility to design and shape their own modeling wire-ends using a variety of readily-available shop and household materials. This can make maintaining a working full set of modeling tools, much less costly.

SUMMARY OF THE INVENTION

It is a primary object of this invention to provide a modeling tool for use with moldable materials, that has a handle and a wire-end securing mechanism to allow for the interchanging of wire-ends. The new handle and wire-end securing mechanism releasably secures a wire-end for cutting, carving/scraping, shaping/modeling, molding, or texturing a wide variety of soft, moldable materials.

The advantages of providing this new modeling tool with a handle and a wire-end securing mechanism, as described herein, are as follows: (a) This design allows a user to exchange a wire-end engaged in a handle for replacement if broken, worn, or damaged; (b) Versatility—the design allows a user to create a variety of modeling effects using a single handle and several different interchangeable wire-ends without the need to purchase many different whole modeling tools; (c) Users have the flexibility and capability to design and shape their own wire-ends using a variety of readily-available shop and household materials (such as bobby-pins, round or flat spring wire, paper-clips, half-round wire, etc.) for engagement with the new handle; (d) Design flexibility—the ability of artists to design and shape wire-ends allows for greater creativity in producing known modeling effects and creating new modeling techniques, and can help decrease the cost of maintaining a working full set of modeling tool components (which, in turn, leads to reduced final art work fabrication costs); and (e) Reducing the number of handles needed for a working full set of modeling tools leads to less waste when wire-ends break, wear-out, or are damaged.

Briefly described, the invention includes modeling tools for use with moldable materials. One such tool as characterized herein, has a handle having at least one end with a recess in it for receiving an end-portion of a wire-end.

A threaded recess is included in the end for receiving a wire-end end-portion disposed within at least one groove of an at least partially threaded pin. Likewise, the wire-end may take on a variety of shapes (e.g., hook, loop, slight curvature, a linear section for carving, etc.), sizes, thicknesses, and cross-sectional shapes, and be made of many different suitable materials of varying stiffness. Further, the handles of these modeling tools can have a second end with a recess in it for receiving an end-portion of a second wire-end which can, also, be releasably secured to the handle. This allows for two wire-ends to be engaged with one handle.

BRIEF DESCRIPTION OF THE DRAWINGS

The invention will be more particularly described by referencing the accompanying drawings of the preferred embodiments, in which like numerals designate like parts.

DETAILED DESCRIPTION OF THE PREFERRED EMBODIMENTS

Figure 1:
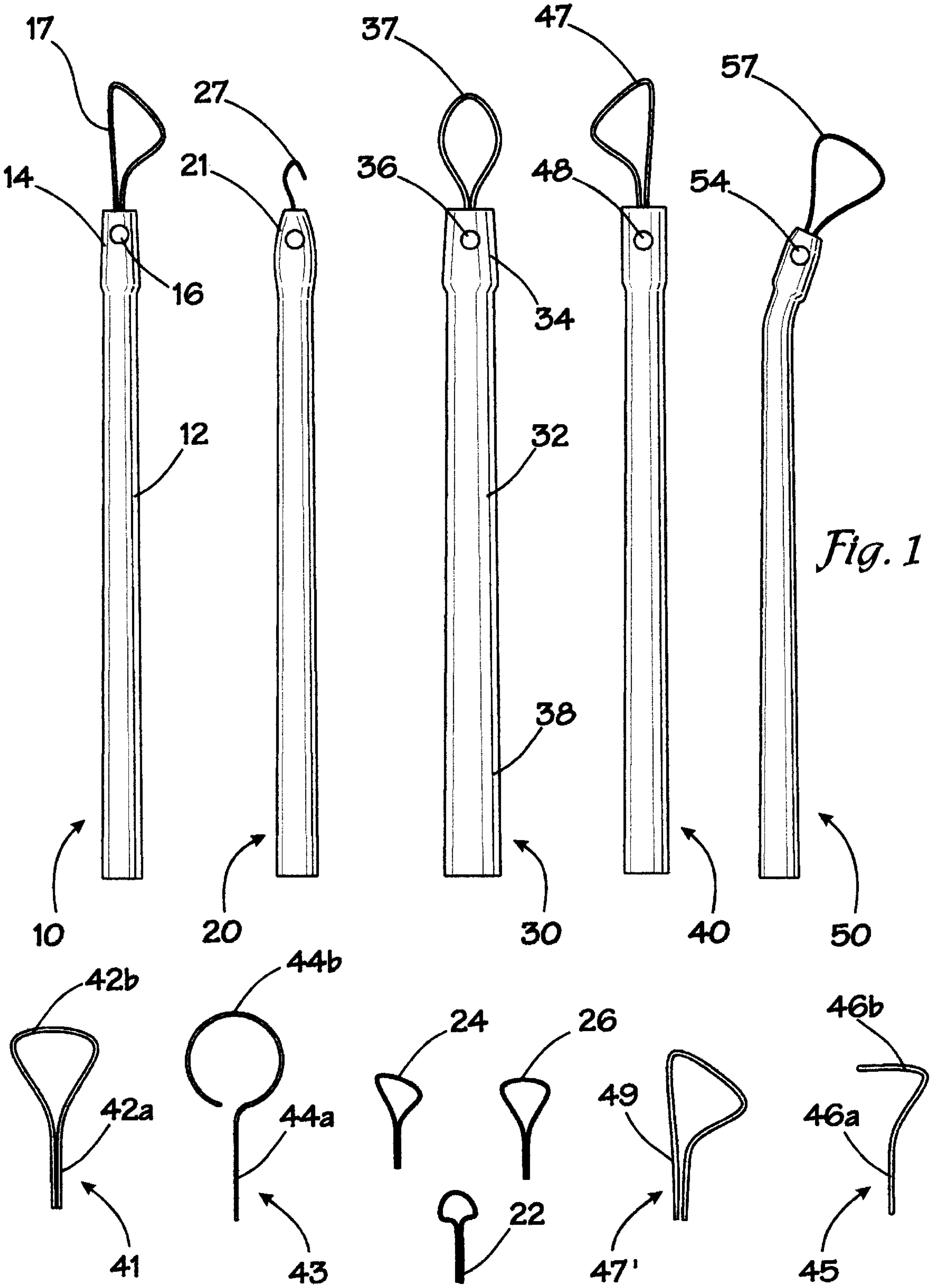
FIG. 1 shows overhead elevational views of several preferred tools and wire-ends of the invention, illustrating the great variety in shapes, sizes, and thicknesses thereof.

The overhead elevational views in FIG. 1 illustrate the great variety of shapes, sizes, and thicknesses of the preferred modeling tools shown at 10, 20, 30, 40, and 50, and the variety of shapes, sizes, and thicknesses of wire-ends (17, 22, 24, 26, 27, 37, 41, 43, 45, 47, 57) of the invention. Modeling tool 10 has a handle 12 having an end 14 from which wire-end 17 extends (details of engagement of wire-ends such as that at 17 into a handle such as that at 12 are shown in connection with FIGS. 3 through 8). Set screw 16

(shown enlarged in FIG. 2) releasably secures wire-end 17 to handle 12. Hook-shaped wire-end 27 extends from handle end 21 of tool 20. Flat spring (such as ribbon wire) has been looped to form wire-end 37 that is releasably secured with pin 36 to end 34 of handle 32 (second end 38 has no wire-end extending therefrom). Wire-end 47 is releasably secured with pin 48 to tool 40. And, shown also, is a wire-end 57 releasably secured to handle end 54 of tool 50. The wire-end shown at 47' is wire-end 47 which has been removed from tool 40 to illustrate the end-portion 49, and also "flipped over". End portion 49 is shown comprised of two "legs" or strands of wire formed after fabricating the odd-shaped loop. This unique preferred tool design accommodates many other wire-ends: for example, tool 40 can accommodate wire-ends 41, 43, 45; and tool 20 can accommodate a variety of smaller-sized wire-end shapes such as those at 22, 24, and 26.

The handles of tools 10, 20, 30, 40, 50 can be plastic, wood, metal alloy, and other suitable materials of similar strength. Suitable metals include metal alloys (such as 2011 and 6061 wrought aluminum alloy, the outer surface of which can be anodized) and other relatively lightweight metals machinable, or otherwise capable of being shaped into a handle. The Appendix of the textbook *Process and Materials of Manufacture,* 2nd edition, by Roy A. Lindberg (University of Wisconsin) published by Allyn and Bacon, Inc. (such Appendix incorporated herein by reference), provides tensile strength, significant material characteristics, and fabricating methods for several suitable thermoplastics (including Cellulose Acetate Propionate, Acrylic, Nylon, and Polypropylene) and several thermosetting plastics (such as Casein, Cold molded, and Epoxy). Examples of fabricating methods suitable for handles of the present invention include injection molding, machining, compression molding, and extrusion.

Using known techniques, wire-end 41 can be formed of ribbon stainless steel stock into a loop 42*b* and doubled over to form end-portion 42*a*. The wire-end at 43 comprises hook-shaped 44*b* round steel wire with end-portion 44*a* (a single strand). Wire-end 47 could be round, half-round, etc., as desired and sharpened, notched, or otherwise textured as desired. Wire-end 45 is made of spring stock bent to create a linear cutting portion 46*b* (which also could be sharpened, notched, or otherwise textured) and its end-portion 46*a*. Wire-ends can be formed of a multitude of materials such as sharpened ribbon stainless steel, tempered stainless steel, flat watch spring steel, music wire, half-round spring steel, heavy stainless steel ribbon, plastic wire (having suitable strength, fatigue, and stiffness characteristics), and other suitably-sturdy stock.

Figure 2:
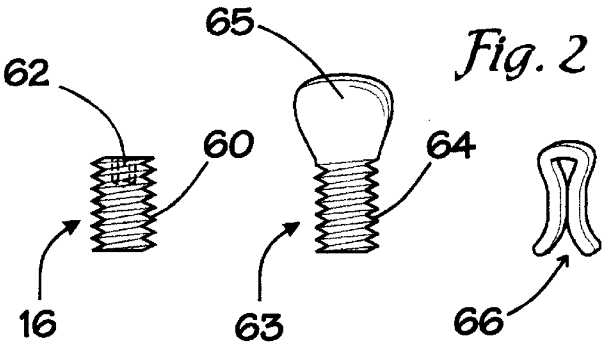
FIG. 2 illustrates examples of pins which can be used to releasably secure wire-ends to handles of the invention.
Figure 3:
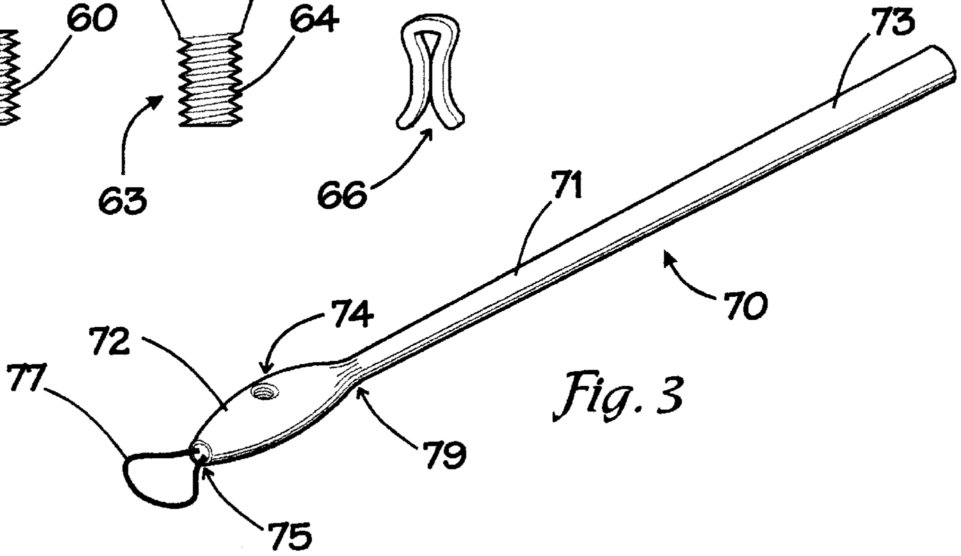
FIG. 3 is an isometric view of a preferred tool of the invention with an handle of length "L".

Shown in FIG. 2 are several examples of suitable pins for engagement with an aperture located at an end of a tool handle (such as the aperture shown at 74 in FIG. 3). A set screw is shown at 16 with a threaded portion 60 and a keyed-position 62 that can accept an allen wrench, phillips or standard screw driver, or other tool used for applying torque to twist the screw into place. At 63 is a partially threaded (at 64) dowel with a thickened or larger end 65 for grasping and twisting the dowel into place. Such a suitable dowel need not be threaded as long as its press-fit engagement is disengageable with a tool or by hand. A spring clip is shown at 66 which can be press-fit and released into an aperture in the tool handle. Regardless of the type of pin used, it is critical that the pin be capable of being tightened enough to secure the end-portion of a chosen, suitably sized wire-end against the inner wall of a recess located at a handle end, yet be capable of being untightened with an allen wrench, screw driver, or other tool (or by hand if a thickened grasping end is integrated with the pin) to let the end-portion of a wire-end be removed.

The preferred modeling tool 70 in FIG. 3 has an aperture 74 for accepting a pin (such as those of FIG. 2) in handle end 72. Handle 71 has an overall length labeled "L" which, by way of example, could range from a couple of inches to over a foot as desired. Also, in end 72 is a recess 75 for receiving wire-end 77. As shown, the outer dimension of handle end 72 is larger than the outer dimension along the handle, nearby (shown at arrow 79)—this has been done, in part, to better accommodate and provide adequate room for fabricating recess 75 into end 72. A second end of handle 71 has been labeled 73 for reference (just as a second end of handle 81 has been labeled 83 in FIG. 4 and a second end of handle 32 has been labeled 38 in FIG. 7).

Figure 4:
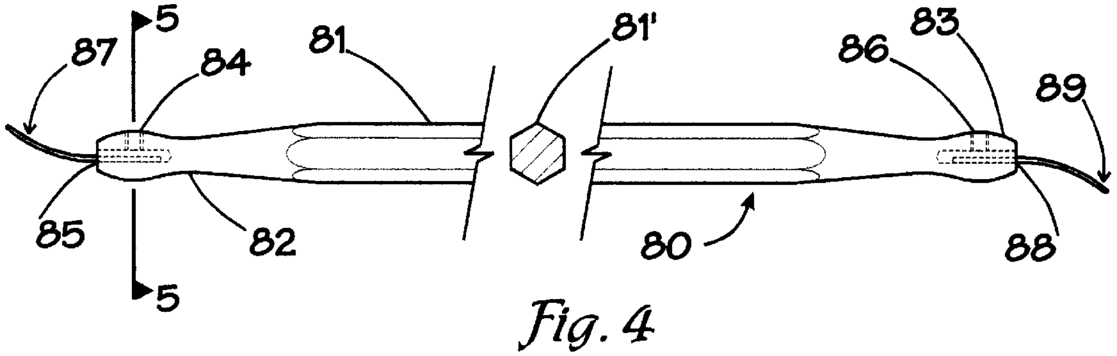
FIG. 4 is a side elevational view of a preferred tool of the invention with a sectional view of the handle (recesses and apertures shown in phantom at the handle ends).
Figure 5A:
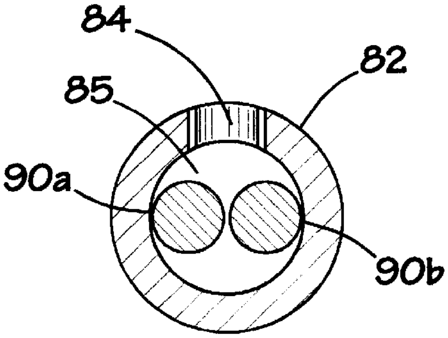
FIGS. 5*a* and 5*b* are slightly enlarged sectional views (taken along 5—5 of FIG. 4) of preferred handle ends of the invention (showing just two examples of the many different structural features the wire-ends and handle ends may have).
Figure 5B:
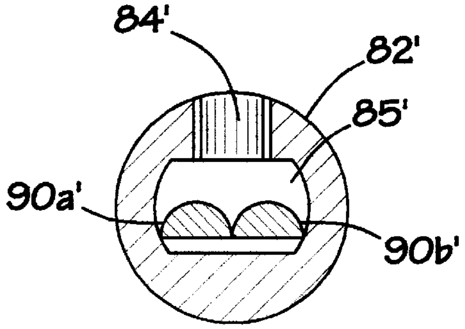

Turning now to FIG. 4, handle 81 of another preferred modeling tool 80 has a hexagonal cross-sectional shape (shown at 81'). The cross-sections of tool handles may take many shapes such as a polygon as shown, a circle, half-round, or even moon-shaped. The outer dimension of tool handles may vary along its length to make it more ergonomic for artists. Handle ends 82 and 83 each have an aperture (84 and 86, respectively), and a recess (85 and 88, respectively) for receiving the end-portion of a wire-end (87 and 89, respectively). The enlarged cross-sectionals of FIGS. 5*a* and 5*b* illustrate handle end details shown in phantom in FIG. 4. In FIG. 5*a*, the end-portion of wire-end 87 is shown as cross-sectional round wires 90*a* and 90*b* (one for each end-portion "leg") inside circular recess 85. Aperture 84 extends through the wall of handle end 82 and into recess 85. In FIG. 5*b*, the wire-end end-portion is shown as two half-round cross-sections at 90*a*' and 90*b*' inside recess 85' (which, as shown, has a couple of flat surfaces). Like aperture 84 of FIG. 5*a*, aperture 84' of FIG. 5*b* extends through the wall of handle end 82' and into recess 85'.

Figure 6:
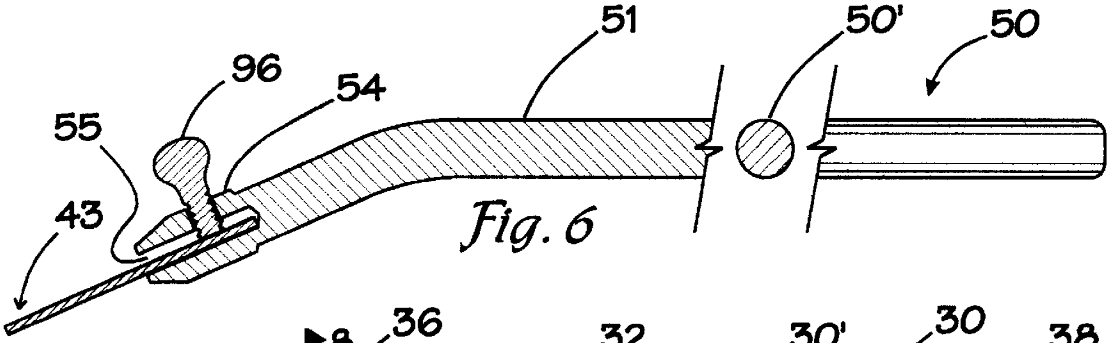
FIGS. 6 and 7 are partial sectional-partial elevational views of preferred tools; illustrated in each of FIGS. 6 and 7, are the details of one of the ends of the handle.
Figure 7:
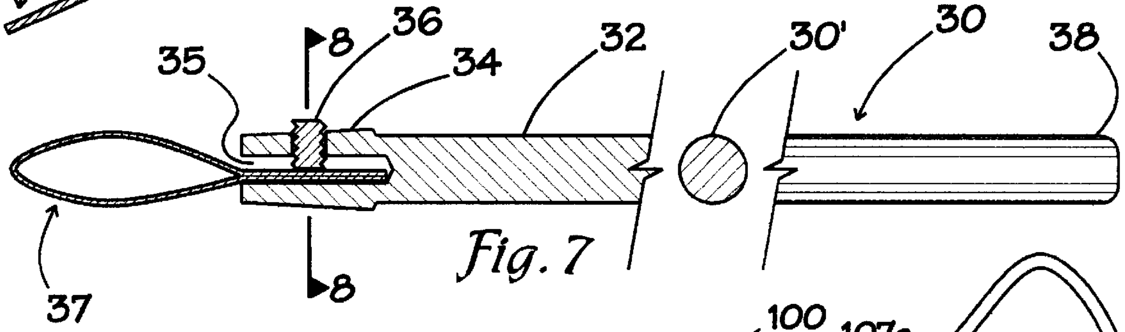

FIGS. 6 and 7 show details of handle ends of preferred tools 50 and 30, respectively (which are also illustrated in FIG. 1). Both tools 50 and 30 are shown with circular cross-sections (shown as sectionals 50' and 30', respectively). Handle 51 of tool 50 has an end 54 with a recess 55 into which wire-end 43 has been placed so that dowel 96 can be press-fit into an aperture and against the end-portion of wire-end 43 to releasably secure it to handle 51. Handle 32 of tool 30 has an end 34 with a recess 35 into which wire-end 37 has been placed so that threaded pin 36 can be twisted into an aperture and against the end-portion of wire-end 37 to releasably secure it to handle 32. Second end 38 could have a similar arrangement with a recess and its own wire-end, although shown without one.

Figure 8:
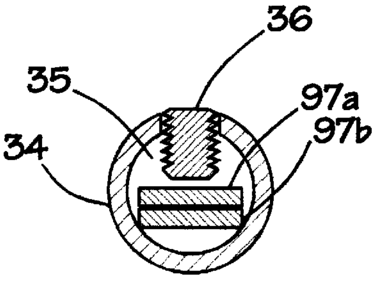
FIG. 8 is a slightly enlarged sectional view (taken along 8—8 of FIG. 7) giving, yet, another example of the many different structural features of the wire-ends and handle ends.

FIG. 8 illustrates the details of the end-portion of flat spring steel wire-end 37: as one can see, it is critical that pin 36 be tightened enough to secure wire pieces 97*a* and 97*b* against the inner wall of recess 35, yet be able to be untightened with a tool (or by hand if a thickened grasping end is integrated with the pin) to let the end-portion of wire-end 37 be removed. Although not illustrated in FIGS. 5*a* and 5*b* (since those cross-sectional views do not include pins), a pin or other suitable fastener engaged in either aperture 84 or 84' would operate in generally the same way to releasably secure respective wire-end end-portions in place for modeling use by an artist.

Figure 9:
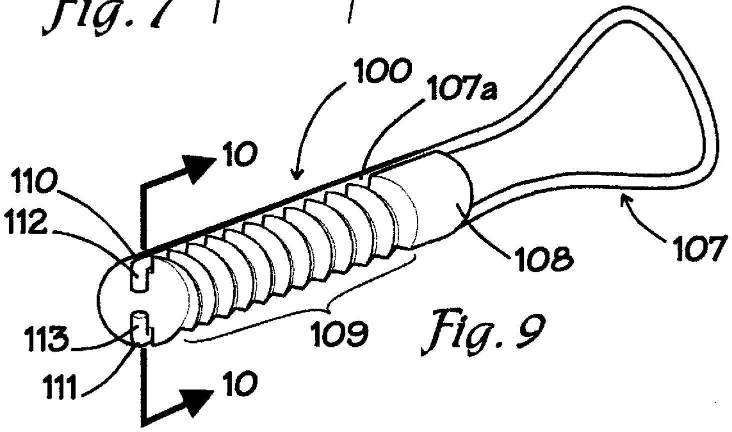
FIG. 9 is an isometric view of an alternative pin and wire-end assembly of the invention.

The alternative modeling tool, shown at 100 in FIG. 9, has a wire-end 107 (although shown as a loop with a linear section, a hook-shape, symmetrical circle shape, etc. are also suitable), with end portion 107*a* disposed within groove 110 of pin 108 (which has a threaded portion 109). Because wire-end 107 is formed into a loop with two "legs", pin 108 has a second groove 111 within which this other "leg" (hidden from view) fits. Finger members have been added and labeled 112 and 113, which "wrap" around the end of pin 108 to aid in maintaining positional relationship between the wire-end 107 and threaded pin 108.

Figure 10:
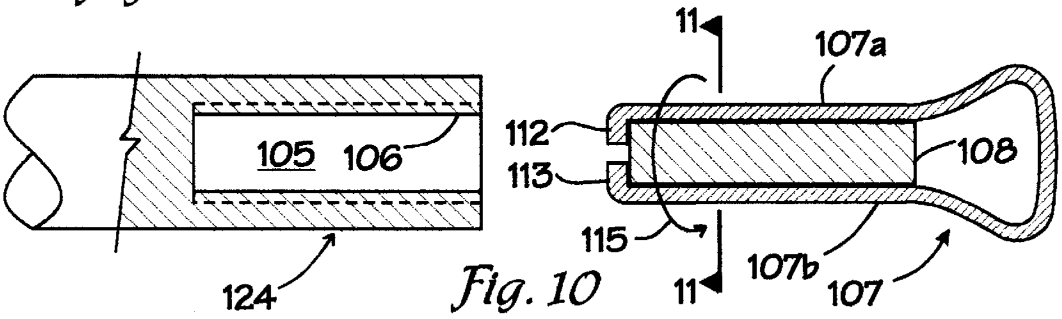
FIG. 10 is a partial sectional view (taken along 10—10 of FIG. 9) of the assembly and of an end of an alternative handle of the invention.
Figure 11:
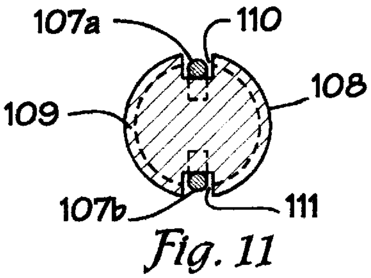
FIG. 11 is a slightly enlarged sectional view (taken along 11—11 of FIG. 10) illustrating the positional relationship between the pin and wire-end of FIGS. 9 and 10.

In the partial sectional of FIG. 10, one can see both "legs" 107*a*, 107*b* and respective finger members 112, 113 against pin 108. Arrow 115 indicates the direction one could twist the wire-end/pin assembly into recess 105, shown at least partially threaded at 106, of handle end 124. Pin 108 can be made from suitable metal, plastic, or even carved from wood. The enlarged cross-sectional of FIG. 11 better illustrates the positioning of end-portion legs 107*a*, 107*b* within grooves 110, 111—these legs should fit so they are generally flush with the outer dimension of threads 109 (of pin 108). The grooves 110, 111 can be cut or filed into pin 108 such that the outer dimension of legs 107*a*, 107*b* do not extend beyond the outer dimension of threads 109 of pin 108. This will allow the threads of the wire-end/pin assembly to fit within threaded recess 105.

Tool handles of the invention need not have a particular thickness, length, or shape. By way of example only, to give a general idea of relative sizes, a tool handle similar to that of FIG. 3 can be made of anodized aluminum alloy having a length of between 5–6 inches, into which a recess approximately 9/16" deep can be drilled using a 1/16" drill, and which has an aperture in an end thereof that can accommodate a 6–32×1/4 set screw.

While certain representative embodiments and details have been shown for the purpose of illustrating the invention, those skilled in the art will readily appreciate that various modifications may be made to the invention without departing from the novel teachings or scope of this invention. Accordingly, all such modifications are intended to be included within the scope of this invention as defined in the following claims. In the claims, any means-plus-function clauses used are intended to cover the structures described herein as performing the recited function and not only structural equivalents but also equivalent structures.

What is claimed is:

1. A modeling tool for use with moldable materials, comprising:

a handle having a first end;

a wire-end having an end-portion comprising at least one leg;

an at least partially threaded pin having a first groove extending substantially the length of said pin;

a first at least partially threaded recess in said first end for receiving said wire-end end-portion, said leg being disposed within said first groove; and said threaded recess and said threaded pin having mating threads.

2. The modeling tool of claim 1 wherein said wire-end is formed into a loop made of a material selected from the group consisting of sharpened ribbon stainless steel, tempered stainless steel, flat watch spring steel, music wire, half-round spring steel, heavy stainless steel ribbon, and sturdy plastic wire.

3. The modeling tool of claim 2 wherein said wire-end end-portion comprises a second leg which is disposed within a second groove of said threaded pin, said second groove located opposite said first groove.

4. The modeling tool of claim 1 wherein said wire-end is hook-shaped made of a material selected from the group consisting of sharpened ribbon stainless steel, tempered stainless steel, flat watch spring steel, music wire, half-round spring steel, heavy stainless steel ribbon, and sturdy plastic wire.

5. The modeling tool of claim 1 wherein said wire-end end-portion comprises a finger member at the end of said leg to aid in maintaining positional relationship between said end-portion and said threaded pin.

6. The modeling tool of claim 1 further comprising:

a second wire-end having a second end-portion comprising at least one leg;

an at least partially threaded second pin having a groove extending substantially the length of said second pin;

a second end of the handle having a second threaded recess for receiving said second wire-end end-portion, said second end-portion leg being disposed within said groove of said second pin; and said second threaded recess and said second pin having mating threads.

* * * * *